United States Patent
McBride et al.

(10) Patent No.: US 7,609,651 B1
(45) Date of Patent: Oct. 27, 2009

(54) METHODS AND SYSTEMS FOR MAINTAINING CONFIGURATION INFORMATION

(75) Inventors: Mark A. McBride, Santa Clara, CA (US); John D. Panelli, Campbell, CA (US); Keerthi K. Arutla, Fremont, CA (US)

(73) Assignee: EMC Corporation, Hopkinton, MA (US)

( * ) Notice: Subject to any disclaimer, the term of this patent is extended or adjusted under 35 U.S.C. 154(b) by 732 days.

(21) Appl. No.: 11/324,839

(22) Filed: Jan. 3, 2006

(51) Int. Cl.
*G06F 11/00* (2006.01)
(52) U.S. Cl. .................. 370/252; 370/254; 707/200; 707/204; 709/223; 711/154; 711/170
(58) Field of Classification Search .............. None
See application file for complete search history.

(56) References Cited

U.S. PATENT DOCUMENTS 6,640,278 B1 * 10/2003 Nolan et al. ............... 711/6

2005/0044207 A1 * 2/2005 Goss et al. ............... 709/224
2006/0085440 A1 * 4/2006 Jandhyala et al. .......... 707/100

* cited by examiner

*Primary Examiner*—Chi H. Pham
*Assistant Examiner*—Shick Hom
(74) *Attorney, Agent, or Firm*—Chapin IP Law, LLC

(57) ABSTRACT

A processor retrieves configuration information (e.g., interoperability rules) indicating acceptable configurations of different types of resources in a storage area network. Based on the retrieved configuration information, the processor generates a set of records. Each record in the set of records includes corresponding identifiers (e.g., numerical integer values) indicating different types of compatible resources associated with a corresponding acceptable storage area network configuration. Each identifier in a respective record maps to a particular manufacturer, model, type, version, etc. of a respective storage area network resource. Consequently, a respective record identifies a group of compatible storage area network resources. For purposes of enabling quick generation of a decision whether a respective configuration is acceptable for use in a storage area network, the processor stores the records in memory and maintains the records in an order depending on respective values of the identifiers stored in the set of records.

20 Claims, 10 Drawing Sheets

| | HOST IDENTIFIER VALUE | HOST BUS ADAPTER IDENTIFIER VALUE | SWITCH IDENTIFIER VALUE | STORAGE ARRAY IDENTIFIER VALUE |
|---|---|---|---|---|
| 120-1 | 101 | 202 | 305 | 401 |
| 120-2 | 101 | 202 | 305 | 402 |
| 120-3 | 101 | 202 | 305 | 403 |
| 120-4 | 101 | 202 | 308 | 401 |
| 120-5 | 101 | 202 | 310 | 401 |
| 120-6 | 101 | 206 | 345 | 401 |
| 120-7 | 101 | 208 | 345 | 401 |
| 120-8 | 102 | 203 | 345 | 401 |
| 120-9 | 102 | 204 | 345 | 401 |
| 120-10 | 105 | 205 | ... | ... |
| 120-N | 188 | 269 | 393 | 496 |

METHODS AND SYSTEMS FOR MAINTAINING CONFIGURATION INFORMATION

RELATED APPLICATION

This application is related to U.S. Patent Application entitled "METHODS AND SYSTEMS FOR UTILIZING CONFIGURATION INFORMATION," (U.S. Ser. No. 11/325,144), filed on Jan. 3, 2006, the entire teachings of which are incorporated herein by this reference.

BACKGROUND

In general, a so-called storage area network (SAN) is a collection of data storage systems that are networked via a switching fabric to a number of host computer systems operating as servers. The host computers (or servers) of a respective storage area network access data stored in respective data storage systems on behalf of client computers that request data. For example, according to conventional techniques, upon receiving a storage access request, a respective host computer accesses a large repository of storage through a switching fabric on behalf of a corresponding requesting client. An access can include a read or write of data to storage.

Typically, many clients can access data through the same host computer or server. Thus, storage area networks enable multiple clients to access one or more shared storage systems through the same host computer. In many applications, storage area networks support hi-speed acquisitions of data so that the host servers are able to promptly retrieve and store data from the data storage system.

Conventional storage area network management applications typically include a graphical user interface (GUI) enabling a network manager to graphically manage, control, and configure various types of hardware and software resources associated with a corresponding storage area network. For example, conventional network management storage applications sometimes generate a graphical user interface utilized by a network manager to graphically select, interact with, and manage local or remote devices and associated software processes associated with the storage area network.

Based on use of the graphical user interface in combination with an input device such as a hand operated mouse and corresponding pointer displayed on a viewing screen, a network manager can "click" on managed object icons to manage respective hardware and software entities such as file systems, databases, storage devices, peripherals, network data communications devices, etc., associated with the storage area network. Consequently, the network manager can reconfigure a SAN according to users' changing storage access needs.

A respective infrastructure supporting access to data in a storage area network can be quite complex. For example, as discussed above, consider the number of hardware and software components that must work in harmony in order for a user to successfully access data stored in a storage array of a SAN. To access such data, the user application provides file system calls or requests (e.g., open, read, write and so forth) to a file system resource presented to the user application by an operating system executing on the host computer system. The file system receives the file system calls and operates to map such file system calls to a series of I/O requests. The operating system on the host computer system transmits the I/O requests through a host interface device resource, such as an interface card (e.g., SCSI or FibreChannel adapter) having one or more I/O port resources, across an interface cable or networking medium (e.g., in a storage area network implementation) to a front-end adapter interface card resource operating within a high-capacity data storage array of the SAN. The front-end adapter interface card receives the I/O requests and interprets them to identify appropriate data locations within specific storage device resources contained in the storage array.

After the requested data is accessed from the storage devices, respective I/O responses are returned from the accessed storage system to the user application along an information or data flow path (based on operations and processing functionality provided by each of the aforementioned components and resources) in a reverse direction back to the application on the host computer running the client application. In this way, access to data in a conventional storage area network involves reliance on a proper operation and coordination of a multitude of software and hardware resources in a storage area network to retrieve data from storage and serve the data to a client.

If even a single resource such as a switch, operating system, host bus adapter, storage system, etc. in a respective storage area network is incompatible with other hardware and/or software resources present in the storage area network, then the storage area network may no longer operate properly for a respective user attempting to retrieve stored data.

One conventional way to ensure that a storage area network will work properly (e.g., so that the storage area network enables users to access corresponding stored data) is to generate a set of interoperability rules indicating valid storage area network configurations and store the interoperability rules in an Oracle database. In general, the set of interoperability rules indicates which combination of different types of resources are compatible with each other and can be used together in a respective storage area network. To ensure that a storage area network configuration is valid, an administrator can review respective interoperability rules prior to modifying a configuration of a respective storage area network. Accordingly, an administrator can be confident that a particular configuration is acceptable prior to actually implementing the respective storage area network configuration.

SUMMARY

Management of a storage area network can be a challenge due to the complex network of resources that must be configured so that the storage area network operates properly for a multitude of different types of users. For example, a storage area network typically includes a multitude of storage area network resources (such as respective resources in a path between a host resource and storage array) working in harmony so that a host resource (e.g., server) of the storage area network can access data from the storage arrays on behalf of requesting clients. In certain cases, when even a single resource in the storage area network is not compatible with other resources in a long chain of respective resources, a client in communication with a host resource of the storage area network may not be able to access data in the storage area network.

As discussed above, one conventional way to identify whether a group of resources is compatible for use in a respective storage area network is to query a respective database storing such information and perform a comparison. A drawback associated with this conventional way of managing the storage area network is that access to the respective database can be quite slow. Additionally, it is often difficult to quickly search the respective database to retrieve relevant data. Accordingly, conventional methods of determining whether a storage area network configuration is acceptable are quite slow.

Techniques discussed herein deviate with respect to conventional applications such as those discussed above as well as additional techniques known in the prior art. In particular, certain embodiments herein are directed to generation and maintenance of a useful data structure for managing interoperability rules. The data structure can be easily searched to identify whether a particular specified combination of hardware and software resources is compatible and therefore can be implemented in a respective storage area network without experiencing access errors.

For example, in a general embodiment, a processor (e.g., a processing function) retrieves configuration information (e.g., interoperability rules) indicating configurations of different types of elements such as resources in a storage area network. Based on the retrieved configuration information, the processor generates a set of records according to a binary format. Each record in the set of records includes corresponding identifiers (e.g., numerical integer values) indicating the different types of resources (e.g., elements) associated with a respective storage area network configuration. In one embodiment, each of multiple identifiers in a respective record maps to a particular manufacturer, model, type, version, etc. of a storage area network resource. Consequently, a given record identifies multiple specific types of resources that are compatible (or incompatible as the case may be) for use in a respective storage area network. To enable searching of the records and quick generation of a decision whether a respective configuration is acceptable for use in a storage area network, the processor stores the records in memory (e.g., a cache) and maintains the records in an order depending on respective values of at least a portion of the corresponding identifiers in the set of records.

For illustrative purposes, assume that each of multiple records stored in memory includes a respective numerical identifier for each of multiple different types of storage area network resources. As an example, assume that each of the multiple records includes a first identifier of a corresponding first type of storage area network resource (e.g., a host resource), a second identifier of a corresponding second type of storage area network resource (e.g., a host bus adapter), a third identifier of a corresponding third type of storage area network resource (e.g., a switch device), and a fourth identifier of a corresponding fourth type of storage area network resource (e.g., a storage system). As discussed above, each of the identifiers in the binary records can be a numerical value identifying, for example, a specific one of multiple manufacturers, models, and/or versions of a respective resource type. Accordingly, a given record can specifically identify a respective configuration of multiple compatible resources such as a specific grouping of a host computer, a host bus adapter, a switch, and a storage array (e.g., storage system) for use in the storage area network.

As briefly mentioned above, the processor stores the set of records in an order depending on identifier values in the records. According to one embodiment, after retrieving one or more interoperability rules, the processor processes the corresponding interoperability rules (e.g., interoperability statements) to identify valid combinations of the different types of resources that can be used in the storage area network. For each compatibility rule or statement, the processor i) identifies a respective set of interoperable resources that can be validly used together in the storage area network; ii) maps each resource in the respective set of interoperable resources to a corresponding numerical value; and iii) creates a respective record to include a set of corresponding numerical values identifying the respective set of interoperable resources that can be validly used together in the storage area network.

Further, according to one embodiment, the processor creates the records so that each of multiple records includes a first respective numerical value identifying a corresponding first type of storage area network resource associated with a corresponding valid combination of resources identified by the respective record. The processor sorts the set of records in a sequential order such that an array of records ranges from a first record having a lowest first respective numerical value to a last record having a highest first respective numerical value. Records also can be sorted from highest to lowest. Accordingly, groups of contiguous records in an array of records can have the same respective first identifier value.

In addition to maintaining a first respective identifier value for each record, the processor can maintain each of the records to include a second respective identifier value as well as other respective identifiers. As discussed above, the second respective identifier value indicates another storage area network resource that is part of a group of compatible resources identified by a respective record. The processor can further sort the contiguous group of records (e.g., multiple records having a same respective first numerical value) based on a sequential ordering such that the contiguous group of records in a record array ranges from a first record having a lowest second respective numerical value to a last record having a highest second respective numerical value.

Techniques herein are well suited for use in applications such as management of storage area networks and specific applications as discussed herein. However, it should be noted that configurations herein are not limited to use in such applications and thus configurations herein and deviations thereof are well suited for other applications as well.

Other example embodiments herein include a computerized device (e.g., a host computer, workstation, etc.) configured to support the techniques disclosed herein to facilitate maintaining a template of acceptable (or unacceptable) storage area network configurations. In such embodiments, the computerized device such as a storage area network management control center includes a memory system, a processor (e.g., a processing device), a display, and an interconnect. The interconnect supports communications among the display, the processor, and the memory system. The memory system is encoded with a management application that, when executed on the processor, produces a data structure of interoperability records according to techniques herein.

Yet other embodiments of the present application disclosed herein include software programs to perform the method embodiment and operations summarized above and disclosed in detail below in the Detailed Description section of this disclosure. More specifically, one embodiment herein includes a computer program product (e.g., a computer-readable medium). The computer program product includes computer program logic (e.g., software instructions) encoded thereon that can be executed on a computerized device to facilitate conversion and maintenance of interoperability rules according to an embodiment herein. The computer program logic, when executed on at least one processor associated with a computing system, causes the processor to perform the operations (e.g., the methods) indicated herein as embodiments of the present disclosure. Such arrangements as further disclosed herein are typically provided as software, code and/or other data structures arranged or encoded on a computer readable medium such as an optical medium (e.g., CD-ROM), floppy or hard disk, or other medium such as firmware or microcode in one or more ROM or RAM or PROM chips or as an Application Specific Integrated Circuit (ASIC). The software or firmware or other such configurations can be installed on a computerized device to cause one or more processors in the computerized device to perform the techniques explained herein.

Yet another more particular technique of the present disclosure is directed to a computer program product that includes a computer readable medium having instructions stored thereon for managing configuration information according to an embodiment herein. The instructions, when carried out by a processor of a respective computer device, cause the processor to perform the steps of: i) retrieving configuration information (e.g., interoperability rules in a respective database) indicating configurations of different types of resources in a storage area network; ii) based on the configuration information, generating a set of records, each record in the set including corresponding identifiers indicating the different types of resources associated with a respective storage area network configuration; and iii) maintaining the records in memory in an order depending on respective values of at least a portion of the corresponding identifiers in the set of records. Other embodiments of the present application include software programs to perform any of the method embodiment steps and operations summarized above and disclosed in detail below.

It is to be understood that the system of the present application can be embodied solely as a software program, or as a software program operating in conjunction with corresponding hardware. For example, embodiments of the present application may be implemented in EMC's Control Center (ECC) software application that provides graphical management functionality of storage area network resources. Embodiments of the present application may also be implemented in computer devices that operate the Control Center (ECC) software. Control Center software is manufactured by EMC Corporation of Hopkinton, Mass., USA.

BRIEF DESCRIPTION OF THE DRAWINGS

The foregoing and other objects, features and advantages of the present application will be apparent from the following more particular description of preferred embodiments, as illustrated in the accompanying drawings in which like reference characters refer to the same parts throughout the different views. The drawings are not necessarily to scale, with emphasis instead being placed upon illustrating example embodiments, principles and concepts.

FIG. 4 is a diagram illustrating a sorted set of interoperability records in tabular form according to an embodiment herein.

DETAILED DESCRIPTION

According to one embodiment herein, a processor retrieves configuration information (e.g., one or more interoperability rules) from a database indicating acceptable configurations of different types of resources that can be used together in a storage area network. Based on the retrieved configuration information, the processor generates a set of records for storage in a binary cache. Each record in the set of records generated by the processor includes corresponding identifiers (e.g., numerical integer values) indicating the different types of compatible resources associated with a corresponding acceptable storage area network configuration. In one embodiment, each identifier in a respective record maps to a particular manufacturer, model, type, and/or version, etc. of a respective storage area network resource. Consequently, a respective record identifies a group of specific types of compatible storage area network resources based on use of a set of numerical identifiers.

For purposes of enabling quick generation of a decision whether a respective configuration is acceptable for use in a storage area network, the processor stores the records in memory and maintains the records in an order depending on respective values of the identifiers stored in the set of records. For example, in one embodiment, the processor sorts the records according to a respective value of a first type of identifier stored in each record of the set of records such that at least one contiguous subset of records in the set includes a same first identifier value. Additionally, for a respective group of contiguous records having the same first identifier value, the processor sorts the contiguous subset of records in numerical order based on a second type of identifier value in each record of the contiguous set of records, and so on.

Figure 1:
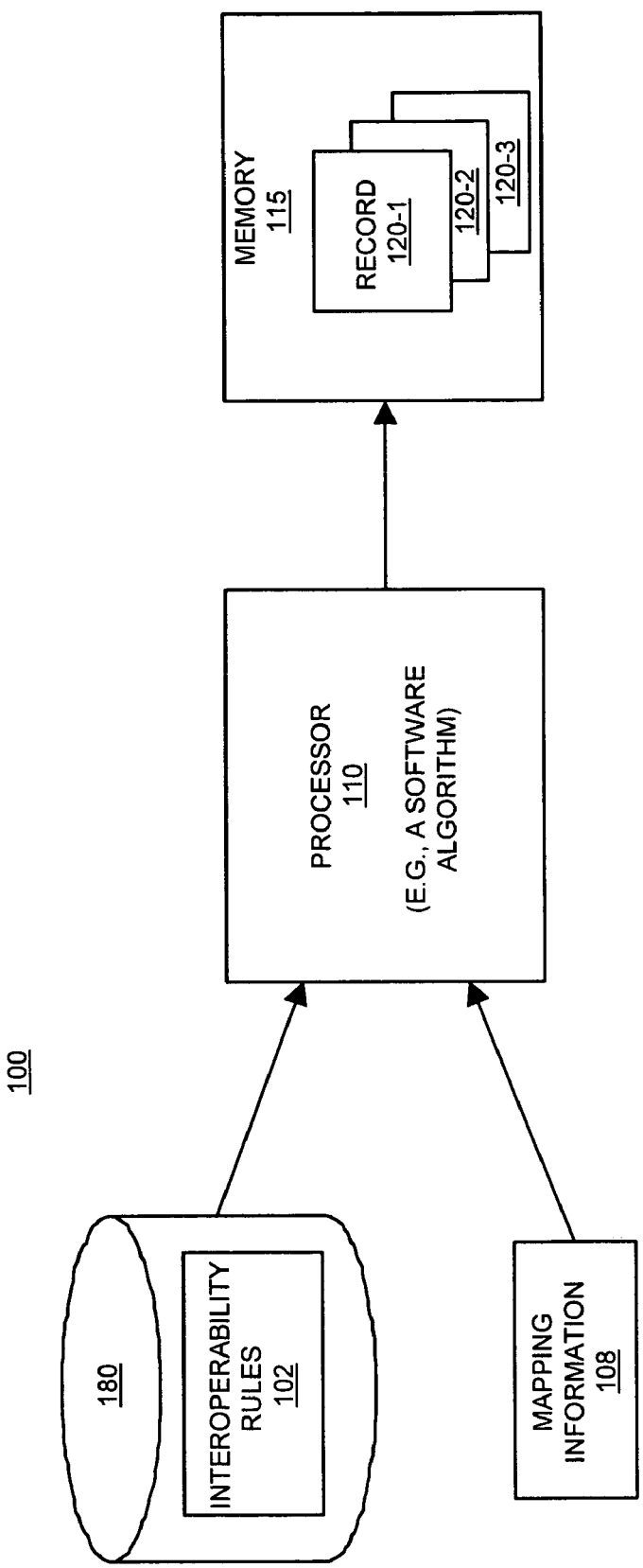
FIG. 1 is a block diagram of a processing environment configured to generate and maintain a set of interoperability records according to an embodiment herein.

FIG. 1 illustrates an environment 100 suitable for explaining an operation of example embodiments herein. As shown, environment 100 includes repository 180 (e.g., an Oracle™ database), mapping information 108, processor 110, and memory 115 (e.g., a high speed storage mechanism such as a cache). Repository 180 stores interoperability rules 102. Memory 115 stores set of records 120 including record 120-1, record 120-2, and 120-3.

In the example embodiment shown, the interoperability rules 102 identify different valid combinations of resources that can be used in a respective storage area network. However, according to another embodiment herein, note that the set of interoperability rules 102 can be modified to identify unacceptable combinations of resources that, if used in a respective storage area network, would result in data access errors due to equipment incompatibility.

As discussed briefly above, one purpose of the techniques herein is to enable a storage area network administrator to more quickly obtain a result as to whether a specific combination of resources are compatible and thus can be used in a storage area network. An inquiry provided by the network administrator or other entity can be based on a current configuration (or incremental changes to a set) of resources already deployed in a respective storage area network or a theoretical model of a set of resources that have not yet been used in the storage area network. The information stored in records 120 provides a basis for determining whether a group of specified resources (e.g., either a current storage area network configuration or a modeling of a storage area network configuration) is compatible with each other for use in a respective storage area network. As will be further discussed later in this specification, accessing and searching records 120 in memory 115 is relatively fast compared to accessing and searching interoperability rules 102 stored in a database to determine whether a respective configuration is acceptable.

In any event, prior to processing respective inquiries and generating an indication of whether a combination of storage area network resources is acceptable or not, processor 110 performs a conversion of interoperability rules 102 into a set of records 120 for storage in memory 115.

According to one embodiment herein, the conversion process includes retrieving a respective interoperability rule from repository 180. The retrieved interoperability rule identifies a valid combination of resources that can be used in the storage area network. For example, a corresponding interoperability rule can identify a compatible set of resources including a host, host bus adapter, switch, and storage array for use in a respective storage area network.

Based on contents of the retrieved interoperability rule, the processor 110 then identifies each specific resource (e.g., based on a respective string of character information including letters, numbers, etc.) associated with a corresponding valid combination of resources. In lieu of storing the character information of the interoperability rules in a respective record, the processor utilizes mapping information 108 to convert the information stored in a retrieved interoperability rule into a set of numerical values for storage in a corresponding record 120 of memory 1115. As discussed above, the numerical values in a respective record map to the specific set of storage area network resources identified by the retrieved interoperability rule.

The processor 110 repeats this process of converting, generating, and storing a respective record in memory 115 for each of multiple interoperability rules 102 stored in repository 180. As will be further discussed later in this specification (with respect to FIG. 4), in as discussed addition to the above techniques, a single interoperability rule retrieved from repository 180 can be converted into multiple records for storage in memory 115 or multiple interoperability rules 102 can be converted into a single record for storage in memory 115.

Figure 2:
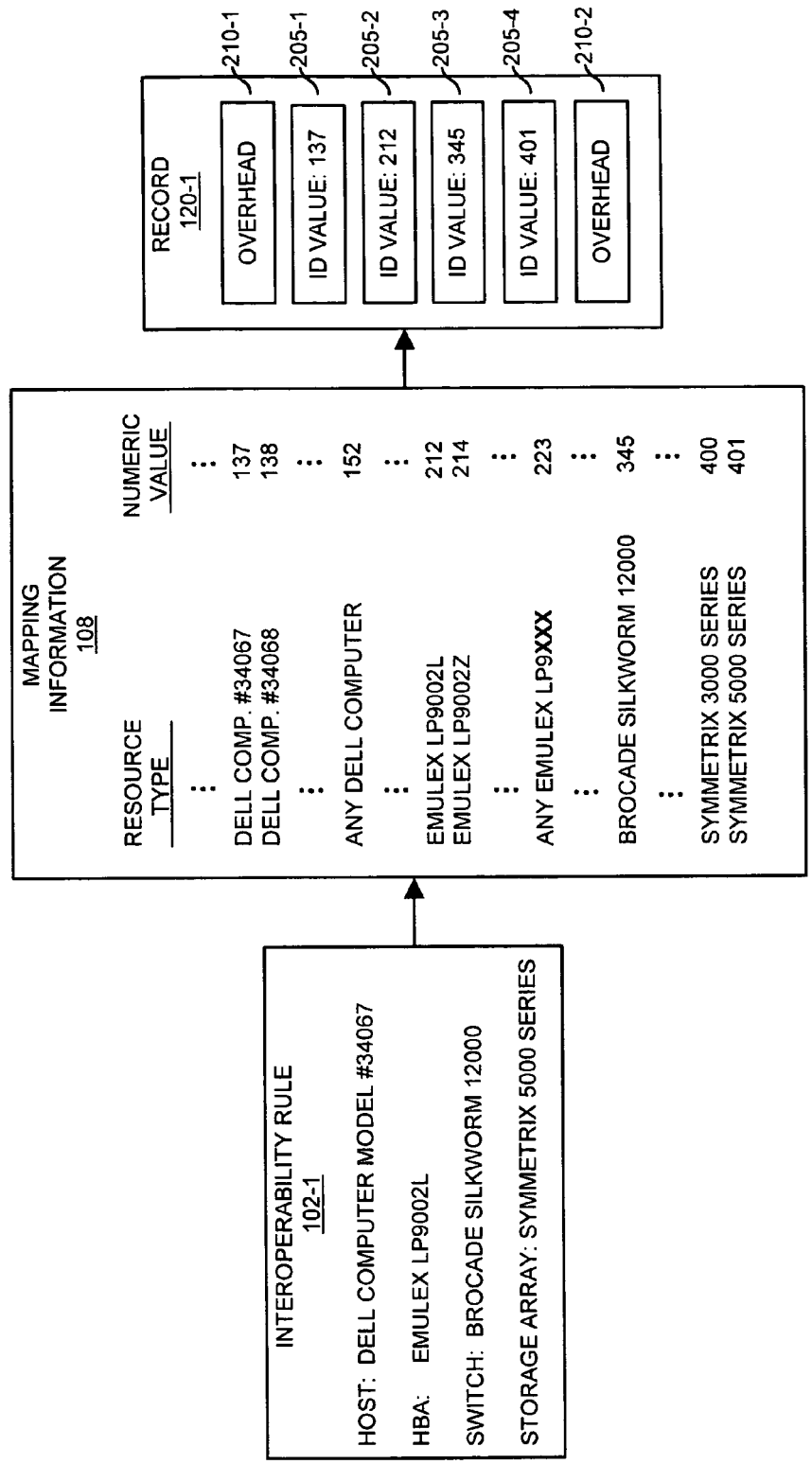
FIG. 2 is a diagram illustrating use of mapping information to convert interoperability rules into respective records according to an embodiment herein.

FIG. 2 is a diagram more particularly illustrating a technique of converting interoperability rules 102 into respective records 120 according to an embodiment herein. For example, processor 110 first retrieves interoperability rule 102-1 from repository 180 such as a database. The interoperability rule 102-1 identifies a specific combination of unique resources that are compatible for use in a respective storage area network.

Figure 5:
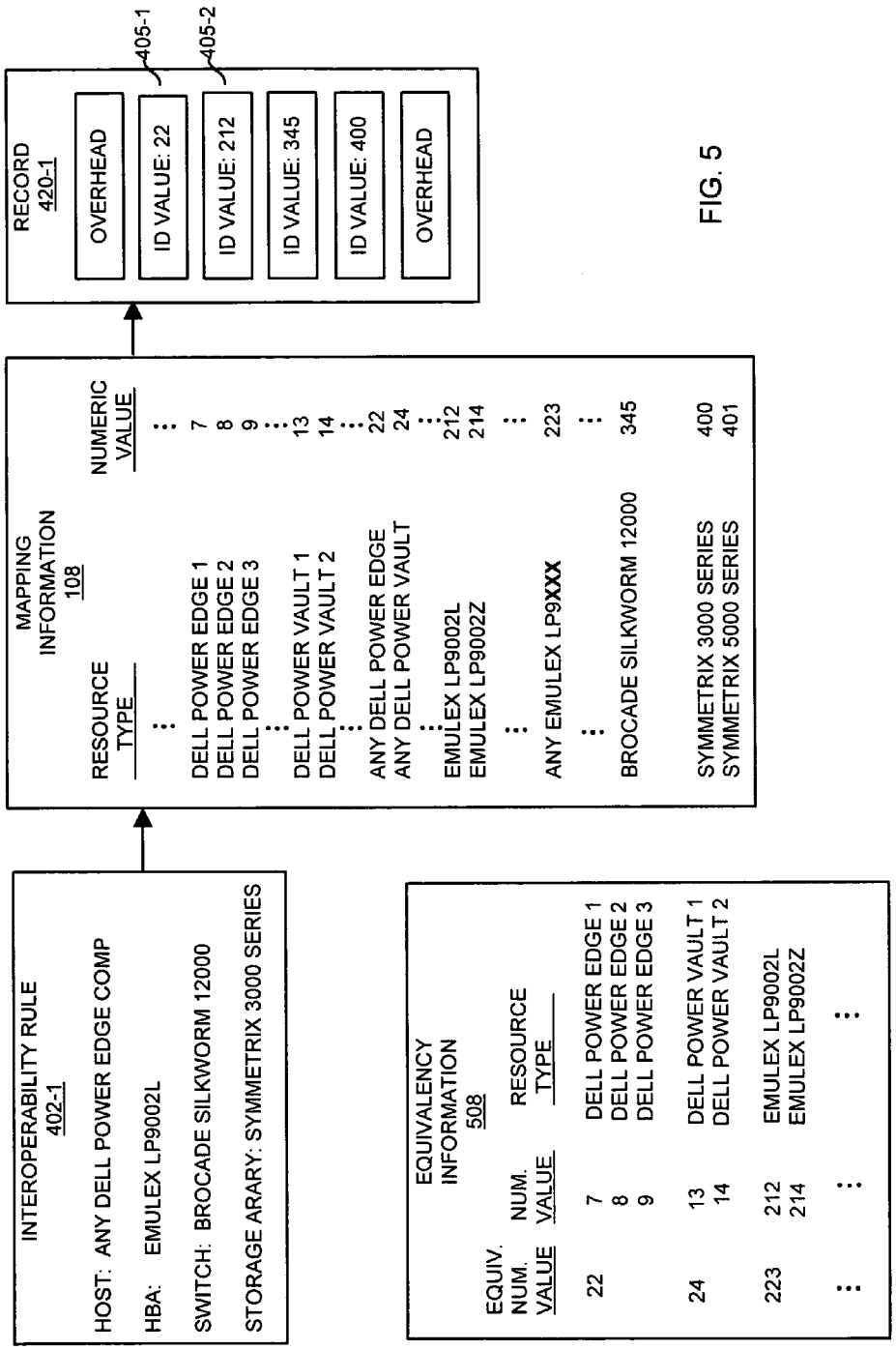
FIG. 5 is a diagram illustrating use of mapping information to convert interoperability rules into respective records according to an embodiment herein.

In the present example, interoperability rule 102-1 identifies that a certain combination of a single host type, a single host bus adapter type, a single switch type, and a single storage array type that are compatible for use in a respective storage area network. Note that FIG. 5 illustrates example techniques in which an interoperability rule 102 and/or respective record potentially specifies one or more ranges of compatible resources. For example, as will be discussed later in this specification, an interoperability rule 102 and corresponding records 120 can identify a combination of a range or ranges of different resources (rather than a single resource type) that are compatible with other specified resources.

Referring again to FIG. 2, interoperability rule 102-1 indicates that a host such as Dell™ computer model #34067, a host bus adapter such as an Emulex™ LP9002L, a switch such as a Brocade™ Silkworm 12000, and storage array such as a Symmetrix™ 5000 series is a valid combination of resources that can be used in a respective storage area network.

Note that storage area network resources can be defined or differentiated from each other based on many different types of attributes. For example, storage area network resources can be differentiated based on manufacture type, model type, version, installed software (e.g., drivers, firmware, etc.), year of manufacture, etc.

In one embodiment, the combinations of valid resources as identified by corresponding interoperability rules 120 are pre-tested by a quality assurance group to ensure that such combinations of different types of resources will work in the field. After testing and validation, the quality assurance group pre-testing this combination generates the interoperability rules 102 (a.k.a., one or more CSST or Configuration Support Statements) indicating one or more respective combinations of resources that are valid for use in a respective storage area network application.

Referring again to the conversion process, according to one embodiment herein, after identifying the specific types of compatible storage area network resources identified by interoperability rule 102-1, the processor 110 converts the interoperability rule 102-1 into a respective record based on mapping information 108. For example, for interoperability rule 102-1, the processor 110 creates a respective record 120-1 to include numerical identifier values 205 (e.g., a grouping of numerical identifier value 205-1, numerical identifier value 205-2, numerical identifier value 205-3, and numerical identifier value 205-4) in lieu of storing a long strings of characters (e.g., "Dell Computer MODEL #34067," "Emulex LP9002L," etc.) to identify a compatible set of resources. In one embodiment, the numerical identifier values are respective unique integer values (e.g., 4 byte values) mapping to a respective specific type resource as shown in mapping information 108.

Now, more specifically, conversion of interoperability rule 102-1 by processor 110 involves identifying that interoperability rule 102-1 (at least in part) specifies Dell Computer model #34067 as a host computer for use in a respective valid combination of resources. Based on this information, the processor 110 then converts this specific storage area network resource into a respective numerical value based on mapping information 108. In this case, based on use of mapping information 108, the specified host type in interoperability rule 102-1 (e.g., Dell™ Computer model #34067) maps to unique numerical identifier value 205-1 (e.g., a value of 137) of record 120-1. Additionally, the specified host bus adapter type in interoperability rule 102-1 (e.g., Emulex LP9002L™) maps to numerical identifier value 205-2 (e.g., a value of 212) of record 120-1; the specified switch type in interoperability rule 102-1 (e.g., Brocade Silkworm 12000™) maps to numerical identifier value 205-3 (e.g., a value of 345) of record 120-1; the specified storage array type in interoperability rule 102-1 (e.g., Symmetrix 5000 Series™) maps to numerical identifier value 205-2 (e.g., a value of 401) of record 120-1. Accordingly, one aspect of the techniques herein includes utilizing numerical values as corresponding identifiers mapping to the different types of resources associated with the respective storage area network configuration.

Note that the interoperability rules 102 may already specify integer values identifying corresponding unique types of storage area network resources. In such a case, processor 110 can more easily generate respective records 120 for storage in memory 115 because the mapping step would no longer be necessary in the conversion process. In other words, the mapping operation above is replaced with a copy operation to produce respective records 120 from interoperability rules 102. Also, in the event that the interoperability rules 402 already include integer values, mapping information 108 identifies user understandable items or resource types to which a respective numerical identifier value references.

In furtherance of the above embodiments, a set of records (or portions thereof) maintained and generated by the processor 110 can include a different set of identifiers identifying different combinations of storage area network resources. For example, according to another embodiment, instead of identifying a valid grouping including a respective type of host, host bus adapter, switch and storage array, each of multiple records 120 stored in a respective cache (e.g., memory) includes respective identifiers for a respective group of resources including a specific type of host computer, a specific type of corresponding operating system running on the host computer, a specific type of switch, and a specific type of storage array. Consequently, a generated record 120 is not limited to any one single type of grouping of different storage area network resources.

Note that the number of numerical identifier values included in a respective record can range from as little as two to many more than four as shown in the present example. Also, note that a respective record can include additional information such as overhead information. As shown, record 120-1 includes overhead entry 210-1 and overhead entry 210-2. According to one technique herein, overhead entry 210-1 points to a unique configuration identifier associated with the valid combination of resources as identified by record 120-1. Overhead entry 210-2 of record 120-1 is an offset value pointing to a location in a file describing how the resources in the record 120-1 work together.

Figure 3:
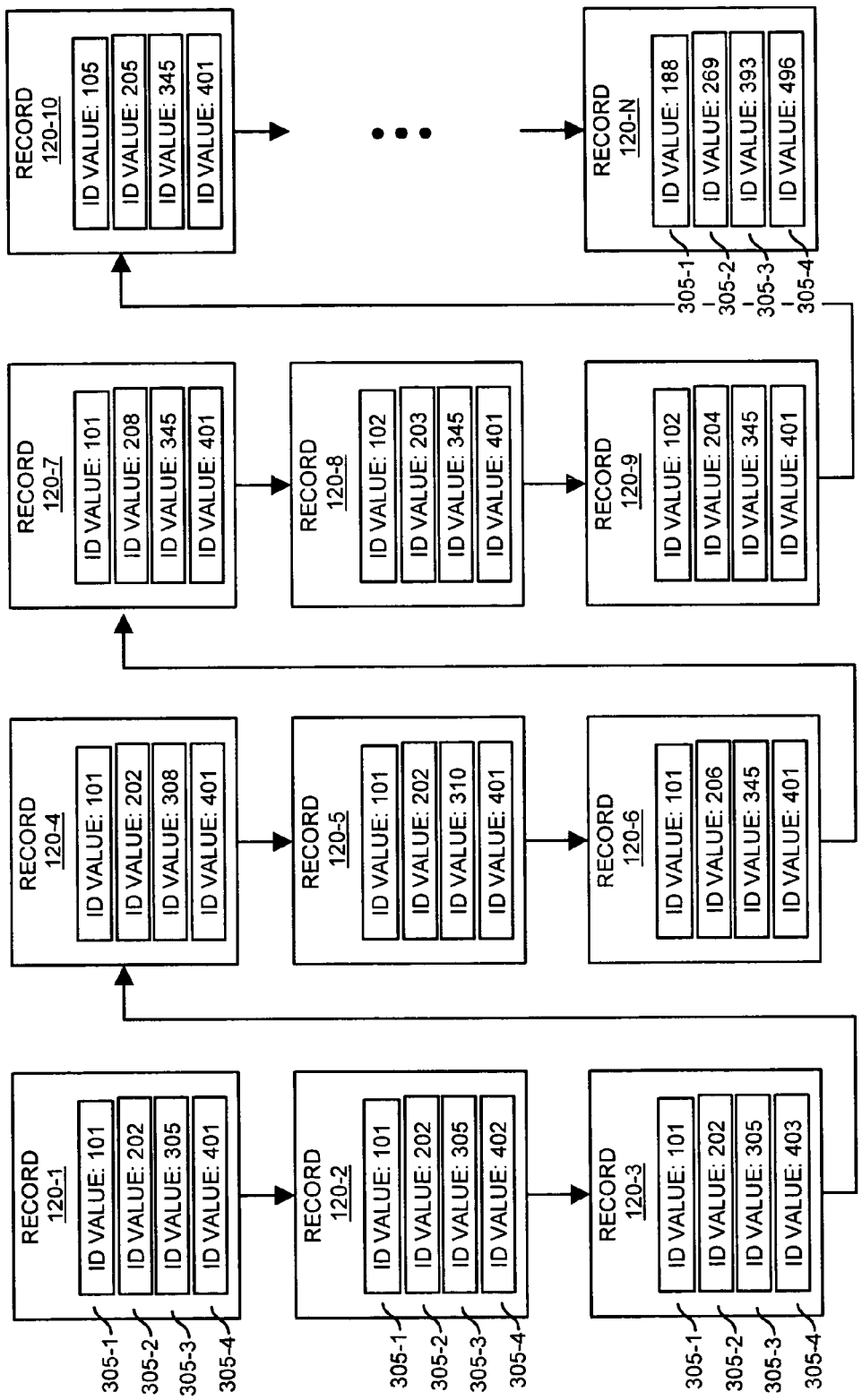
FIG. 3 is a diagram illustrating a technique of sorting a set of interoperability records according to an embodiment herein.

FIG. 3 is an example diagram illustrating how records can be stored in memory or a cache according to an embodiment herein. One purpose of generating and storing records 120 in the manner shown in FIG. 3 is to enable binary searching in an array or records for a valid combination of compatible resources and thus quick generation of a decision whether a respective configuration is acceptable for use in a storage area network. For example, as shown, the processor 110 herein stores the records 120 in memory 115 such as a cache and maintains the records 120 in an order depending on respective values of the numerical identifier values stored in the set of records 120. For example, the processor 110 herein sorts the set of records 120 in a sequential order such that the array of records 120 ranges from a first record 120-1 having a lowest first respective numerical value for the first type of identifier 305-1 to a last record 120-N having a highest first respective numerical value for the first type of identifier 305-1.

Multiple records stored in memory 115 can include a same value for the first type of identifier 305-1. In the example as shown in FIG. 3, the contiguous set of records including record 120-1, record 120-2, record 120-3, record 120-4, record 120-5, record 120-6, and record 120-7 each store the same value of 101 for the first type of identifier 305-1. In such a case, for the contiguous set of records having the same first respective value, the processor 110 further sub-sorts the records based on respective values of a second identifier type 305-2. For example, the processor 110 sorts the contiguous group of records (described above) such that the contiguous group of records in the array ranges from a record 120-1 having a lowest second respective numerical value 305-2 to a last record 120-7 having a highest second respective numerical value 305-2. A portion of the contiguous subset of records can have the same second respective identifier value 305-2. This process of sub-sorting can be repeated for each successive lower level of identifier values associated with the records.

In one embodiment, the processor 110 stores the records 120 as a block of memory and sorts the records 120 in the block of memory according to respective numerical identifier values stored in each record as discussed above. In response to receiving new interoperability rules 102 or a modified version of the interoperability rules 102, the processor 110 stores corresponding newly generated records in the block of memory or array so that ordering is consistent with techniques as discussed above. A search engine identifies relevant data in the block of memory using a technique such as a binary or linear search.

FIG. 4 is a diagram illustrating a sorted set of interoperability records in tabular form according to an embodiment herein. As shown, table 400 includes the data for each of multiple records 120 (as in FIG. 3) but in tabular form including columns and rows. The records 120 are sorted according to unique numerical identifier values in the first column (e.g., host identifier value) of table 400. Additionally, the records 120 are sub-sorted according to unique numerical identifier values in the second column (e.g., host bus adapter identifier value) of table 400, and so on.

FIG. 5 is a diagram illustrating conversion of a respective interoperability rule 402-1 into a respective record 420-1 that includes equivalency information according to an embodiment herein. As shown, equivalency mapping information 508 indicates how a single integer value can represent a grouping of multiple types of resources. Note that resources specified in a respective grouping can also be assigned a corresponding unique integer value.

For example, the interoperability rule 402-1 specifies equivalency information such as a range of multiple hosts (e.g., any Dell Power Edge™ computer) rather than only a single, specific type of host computer for use in combination with other identified resources in the interoperability rule 402-1. Use of equivalency mapping information 508 (or range information) reduces the number of interoperability rules that must be stored in repository 180 and records that must be stored in memory 115 because a single interoperability rule and/or record 420 can specify many different types of acceptable (or unacceptable) resource combinations. As shown, mapping information 108 can account for equivalency information in the interoperability rules 102 and include respective numerical identifier values for use in corresponding records 420. Equivalency mapping information 508 more specifically indicates which numerical integer values (e.g., 22, 24, . . . ) in mapping information 508 identify ranges of resources rather than merely a single resource. For example, numerical identifier value 7 indicates only a single resource, whereas numerical identifier value 22 indicates a grouping of resources.

Use of equivalency mapping information 508 according to an embodiment herein can substantially reduce a number of records stored in memory 115. For example, if an interoperability rule 402 or respective record 420 includes a grouping of integers 22, 223, 345, and 400, this represents 6 different combinations (e.g., [7, 212, 345, 400], [8, 212, 345, 400], [9, 212, 345, 400], [7, 214, 345, 400], [8, 214, 345, 400], [9, 214, 345, 400]) of compatible resource groupings for use in a respective storage area network environment. Without use of equivalency mapping information 508, the six respective separate records would have to be maintained in memory 115 to represent the valid combinations of resources.

Thus, processor 110 can generate a single record 420-1 to indicate multiple different combinations of compatible resources that can be used together in the storage area network. As shown, the record 420-1 includes a numerical identifier value 405-1 (a value of 22) indicating a group of different types of resources (e.g., any Dell Power Edge™ computer) and a second numerical identifier value 405-2 (a value of 212) indicating a single type of resource, namely the Emulex LP9002L™. Assume in this example that numeric value 22 in mapping information 108 can be replaced with numerical identifier value 7, numerical identifier value 8, or numerical value 9, all of which specify types of Dell Power Edge™ computers. In other words, assume in this example that the numerical identifier value 22 represents a group of specific type of host computers identified by numerical identifier value 7 (e.g., a Dell Power Edge 1), numerical identifier value 8 (e.g., a Dell Power Edge 2), and numerical identifier value 9 (e.g., a Dell Power Edge 3).

Thus, in this example, one combination of compatible interoperable resources as identified by interoperability rule 402-1 and record 420-1 includes a Dell Power Edge 1 host computer, the Emulex LP9002L™ host bus adapter, the Brocade Silkworm 12000™ switch, and the Symmetrix 3000™ series storage array. Another combination of compatible interoperable resources specified by record 420-1 includes a Dell Power Edge 2 host computer, the Emulex LP9002L™ host bus adapter, the Brocade Silkworm 12000™ switch, and the Symmetrix 3000 Series™ storage array. Yet another combination of compatible interoperable resources specified by record 420-1 includes a Dell Power Edge 3 host computer, the Emulex LP9002L™ host bus adapter, the Brocade Silkworm 12000™ switch, and the Symmetrix 3000 Series™ storage array. Thus, a first acceptable combination of resources can be defined to include a first type of resource (e.g., the Emulex LP9002L™ host bus adapter) and one resource (e.g., Dell Power Edge 1) selected from the respective grouping of a second type of multiple different resources (e.g., any Dell Power Edge™ computer). A second acceptable combination of interoperable resources can be defined to include the first type of resource (e.g., the Emulex LP9002L™ host bus adapter) and another resource (e.g., a Dell Power Edge 2™ computer) selected from the respective grouping of the second type of multiple different resources (e.g., any Dell Power Edge™ computer), and so on.

According to further techniques herein, processor 110 can convert a single interoperability rule 402-1 (including equivalency or range information) into multiple corresponding records. For example, the processor 110 can process a single interoperability statement 402-1 to: i) identify a first type of resource (e.g., a host bus adapter type), ii) identify a second type of resource (e.g., a host type), iii) for the host bus adapter type of resource, identify a corresponding first resource (e.g., the Emulex LP9002L™ host bus adapter), and iv) for the host type of resource, identify a group of multiple different resources that each can be used in combination with the corresponding host bus adapter (as well as a corresponding type of switch resource and storage array resource) as a valid configuration combination in the storage area network. The processor then generates a respective record for each valid configuration combination. For example, the processor 110: i) maps the corresponding first resource (e.g., host bus adapter Emulex LP9002L™) to a respective first numerical integer value of 212; ii) maps one resource (e.g., a Dell Power Edge 1) in the group of multiple different resources to a respective second numerical integer value of 7; and iii) maps another resource (e.g., a Dell Power Edge 2) in the group of multiple different resources to a respective third numerical integer value of 8. The processor 110 then generates a respective first record to include the respective first integer value of 212 and the respective second integer value 7 (as well as numerical identifier values 345 and 400) to represent a first valid combination of resources for use in the storage area network and generates a second record including the respective first integer value of 212 and the respective third integer value of 8 (as well as numerical identifier values 345 and 400) to represent a second valid combination of resources for use in the storage area network.

According to yet further techniques herein, as discussed above, the processor 110 can create a single record (which includes equivalency information such as numerical identifier value 22, numerical identifier value 223, etc.) based on multiple different interoperability rules 402. For example, two different interoperability rules can identify a same grouping of resources with the exception that one of the interoperability rules 102 identifies a Dell Power Edge 1 as a host, another interoperability rule specifies a Dell Power Edge 2 as a host, and another one of the interoperability rules 102 identifies a Dell Power Edge 3 as a host. Assuming in this example that these identified hosts collectively represent all Dell Power Edge computer types, then the processor 110 can create a single record using numerical identifier value 22 (as well as other corresponding numerical identifier values for each respective other type of resource associated with the combinations) to identify multiple combinations of compatible resources. This technique reduces the number of records 420 stored in memory 115 and thus speeds up searching and generating a decision whether a respective configuration is acceptable or not for use in a respective storage area network.

Figure 6:
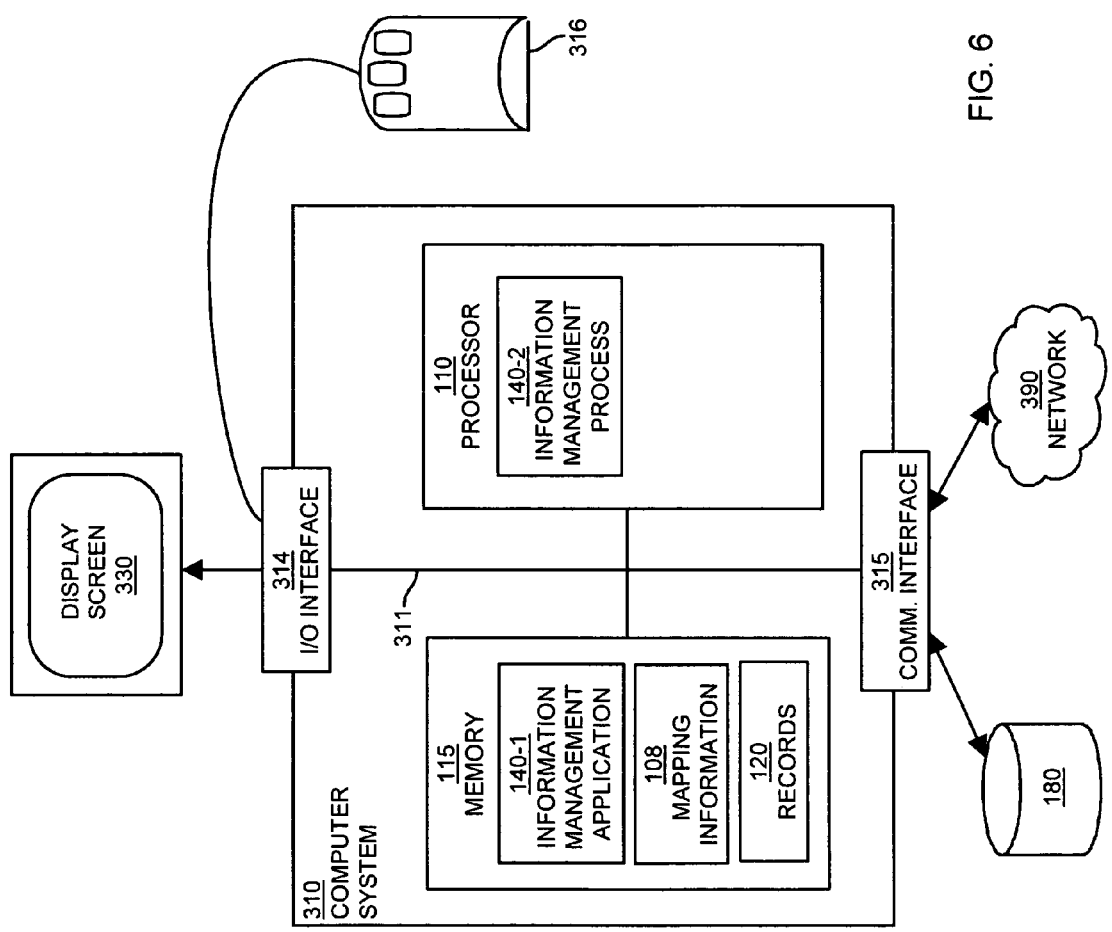
FIG. 6 is a diagram of an example computer system for carrying out operations according to different embodiments described herein.

FIG. 6 is a block diagram illustrating an example architecture of computer system 310 (e.g., a storage area network management station). Computer system 310 may be a digital processing device such as a personal computer, workstation, portable computing device, console, laptop, network terminal, etc.

As shown, computer system 310 of the present example includes an interconnect 311 that couples a memory system 115, a processor 110, an input/output interface 314, and a communications interface 315. Peripheral device 316 (e.g., one or more viewer controlled devices such as a keyboard, mouse, etc.) as well as display screen 330 couple to computer system 310 through I/O interface 314 and enable a respective user to provide input commands and thus generally control functions associated with information management application 140-1. As discussed above, repository 180 stores interoperability rules 102 identifying compatible groups of resources for use in a respective storage area network. Communications interface 315 enables processor 110 of computer system 310 (and corresponding user 108) to communicate with other devices such as repository 180 and other entities over network 390.

As shown, memory 115 is encoded with information management application 140-1 supporting retrieval and management of configuration information associated with respective storage area network resources as discussed herein. Additionally, memory 115 stores mapping information 108 and set of records 120. In one embodiment, information management application 140-1 is embodied as software code such as data and/or logic instructions (e.g., code stored in the memory or on another computer readable medium such as a disk) supporting processing functionality according to different embodiments described herein.

During operation, processor 110 accesses memory system 115 via the interconnect 311 in order to launch, run, execute, interpret or otherwise perform the logic instructions of the information management application 140-1. Execution of information management application 140-1 produces processing functionality in information management process 140-2. In other words, the information management process 140-2 represents one or more portions of the information management application 140-1 performing within or upon the processor 110 in the computerized device 310. As discussed, one purpose of the information manager 120 (e.g., information management application 140-1 and/or information management process 140-2) is to retrieve interoperability rules 102 from repository 180 and convert them into respective records for storage in memory 312. As discussed above, the techniques used to generate and store interoperability records in a corresponding data structure facilitates use of compatibility information.

It should be noted that an information manager 140 executed on computer system 110 can be represented in FIG. 6 by either one or both of the information management application 140-1 and/or the information management process 140-2. For purposes of this discussion, general reference will be made to the information manager 140 as performing or supporting the various steps and functional operations to carry out techniques discussed herein.

It should also be noted that example configurations herein include the information management application 140-1 itself (i.e., the un-executed or non-performing logic instructions and/or data). The information management application 140-1 may be stored on a computer readable medium (such as a floppy disk), hard disk, or optical medium. The information management application 140-1 may also be stored in a memory system 312 such as in firmware, read only memory (ROM), or, as in this example, as executable code in, for example, Random Access Memory (RAM). In addition to these embodiments, it should also be noted that other embodiments herein include the execution of information management application 140-1 in processor 110 as the information management process 140-2. Thus, those skilled in the art will understand that the computer system 110 may include other processes and/or software and hardware components, such as an operating system that facilitates carrying out management functions associated with the storage area network.

Figure 7:
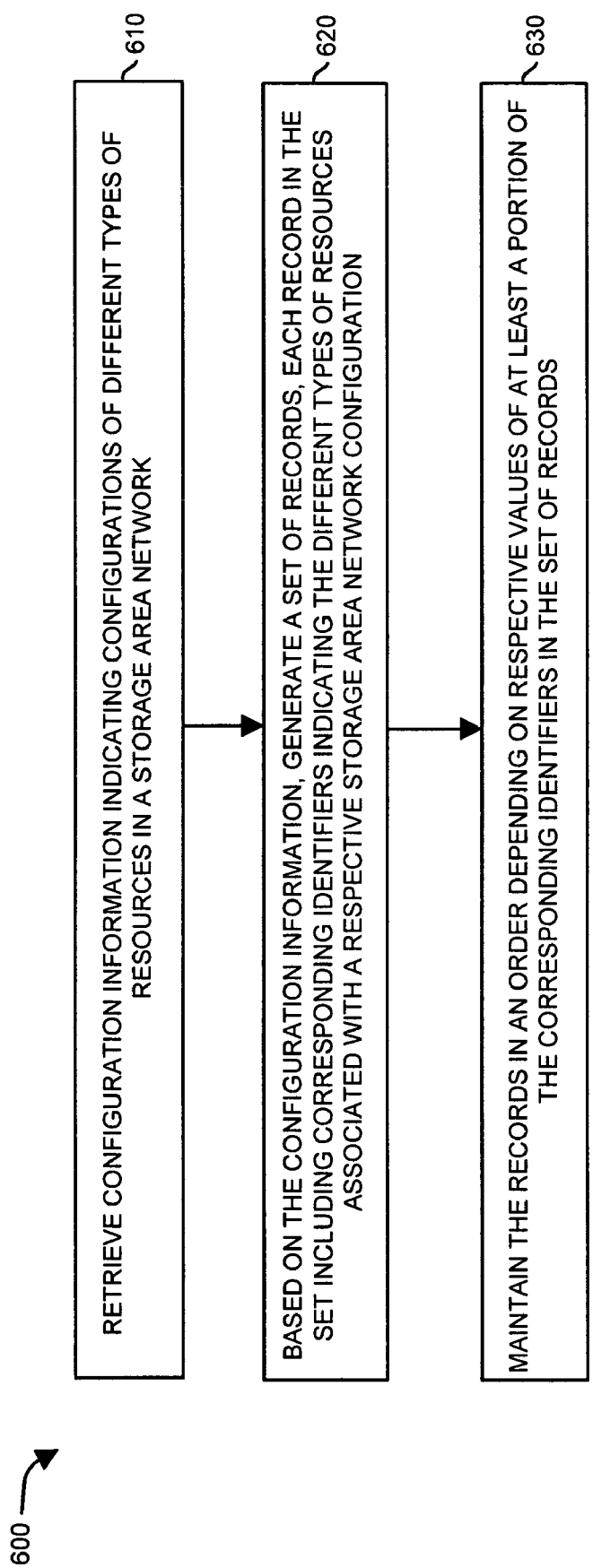
FIG. 7 is a flowchart illustrating a technique of maintaining information associated with a set of interoperability rules according to an embodiment herein.

FIG. 7 is a flowchart 600 illustrating a technique of maintaining records of configuration information according to an embodiment herein. Note that the following discussion of flowchart 600 overlaps with the concepts and techniques discussed above. Processor 110 generally performs the steps via execution of the information manager 140 as discussed above.

In step 610, processor 110 retrieves configuration information (e.g., interoperability rules) indicating configurations of different types of resources in a respective storage area network.

In step 620, based on the retrieved configuration information, the processor 110 generates a set of records 120. Each record in the set of records 120 includes corresponding identifiers (e.g., numerical identifier values 205) indicating the different types of resources associated with a respective storage area network configuration.

In step 630, the processor 110 maintains the set of records 120 in an order depending on respective values of at least a portion of the corresponding identifiers (e.g., numerical identifier values 205) in the set of records 120.

Figure 8:
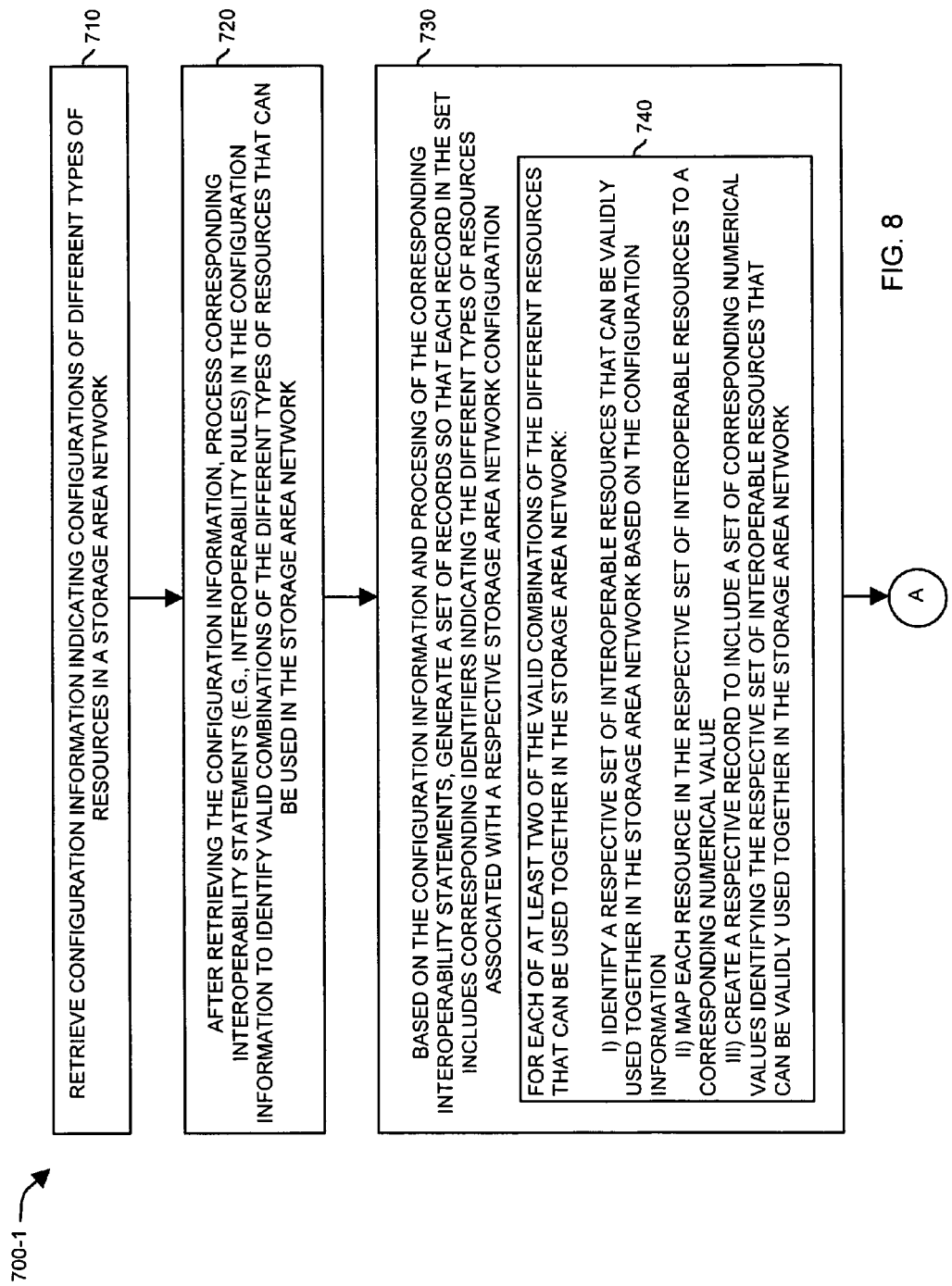
FIGS. 8 and 9 combine to form a flowchart illustrating a technique of creating and maintaining a set of records according to an embodiment herein.
Figure 9:
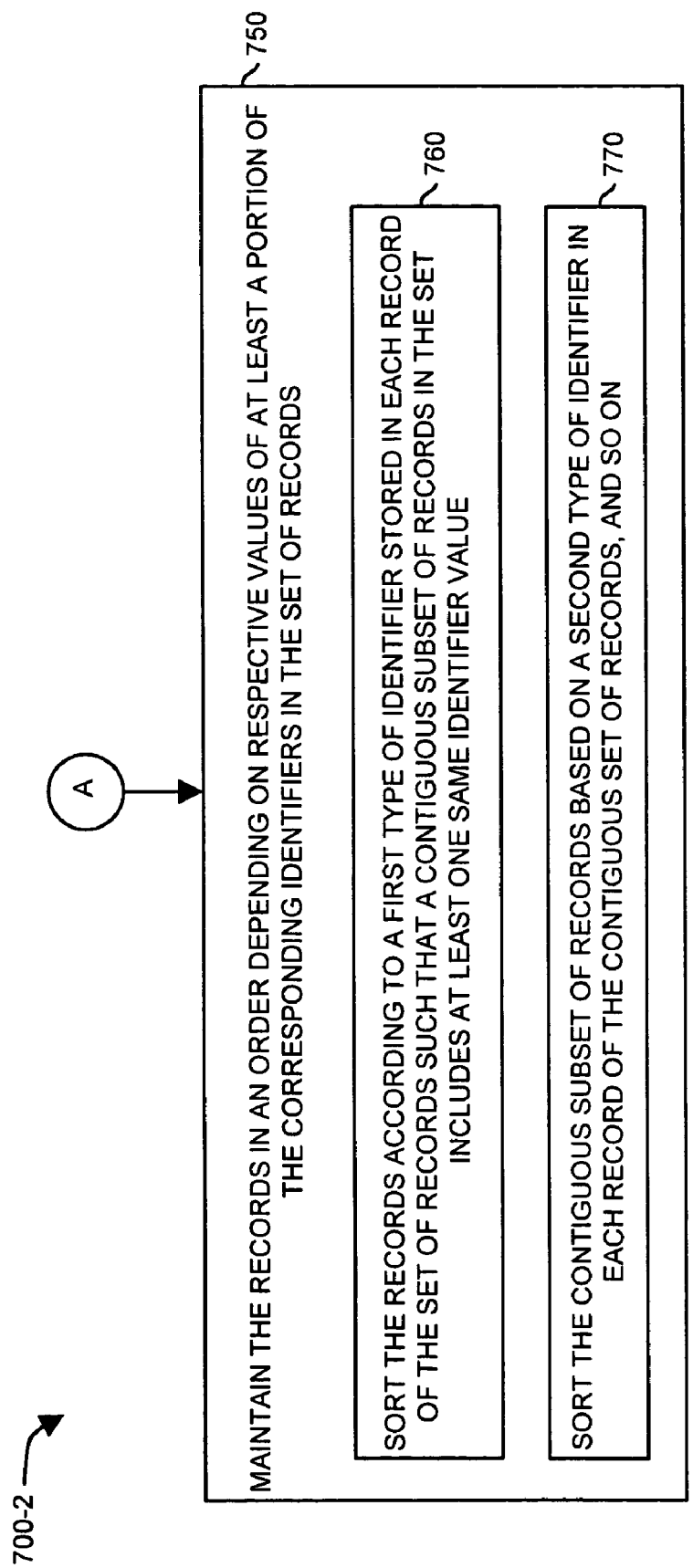

FIGS. 8 and 9 combine to form a more detailed flowchart 700 (e.g., flowchart 700-1 and flowchart 700-2) illustrating processing steps associated with processor 110 of computer system 310 and, more particularly, information manager 140.

In step 710 of FIG. 8, the processor 110 retrieves configuration information indicating configurations of different types of resources in a storage area network.

In step 720, after retrieving the configuration information, the processor 110 processes corresponding interoperability statements (e.g., interoperability rules) in the configuration information to identify valid combinations of the different types of resources that can be used in the storage area network.

In step 730, based on the configuration information and processing of the corresponding interoperability statements, processor 110 generates a set of records so that each record in the set includes corresponding identifiers indicating the different types of resources associated with a respective storage area network configuration.

In sub-step 740 associated with step 730, for each of two or more of the valid combinations of the different resources that can be used together in the storage area network, the processor 110:

i) identifies a respective set of interoperable resources that can be validly used together in the storage area network based on the configuration information, ii) maps each resource in the respective set of interoperable resources to a corresponding numerical value (e.g., a 4 byte integer value), and iii) creates a respective record to include a set of corresponding numerical values identifying the respective set of interoperable resources that can be validly used together in the storage area network.

In step 750 of FIG. 9, the processor 110 maintains the records 120 in an order depending on respective values of at least a portion of the corresponding identifiers in the set of records 120.

For example, in sub-step 760 associated with step 750, the processor 110 sorts the records according to a first type of identifier stored in each record of the set of records such that a contiguous subset of records in the set includes at least one same identifier value.

In sub-step 770 associated with step 770, the processor 110 sorts the contiguous subset of records based on a second type of identifier in each record of the contiguous set of records. As discussed above, the processor 110 can additionally sort the records 120 according to a third type of identifier, fourth type of identifier, and so on.

Figure 10:
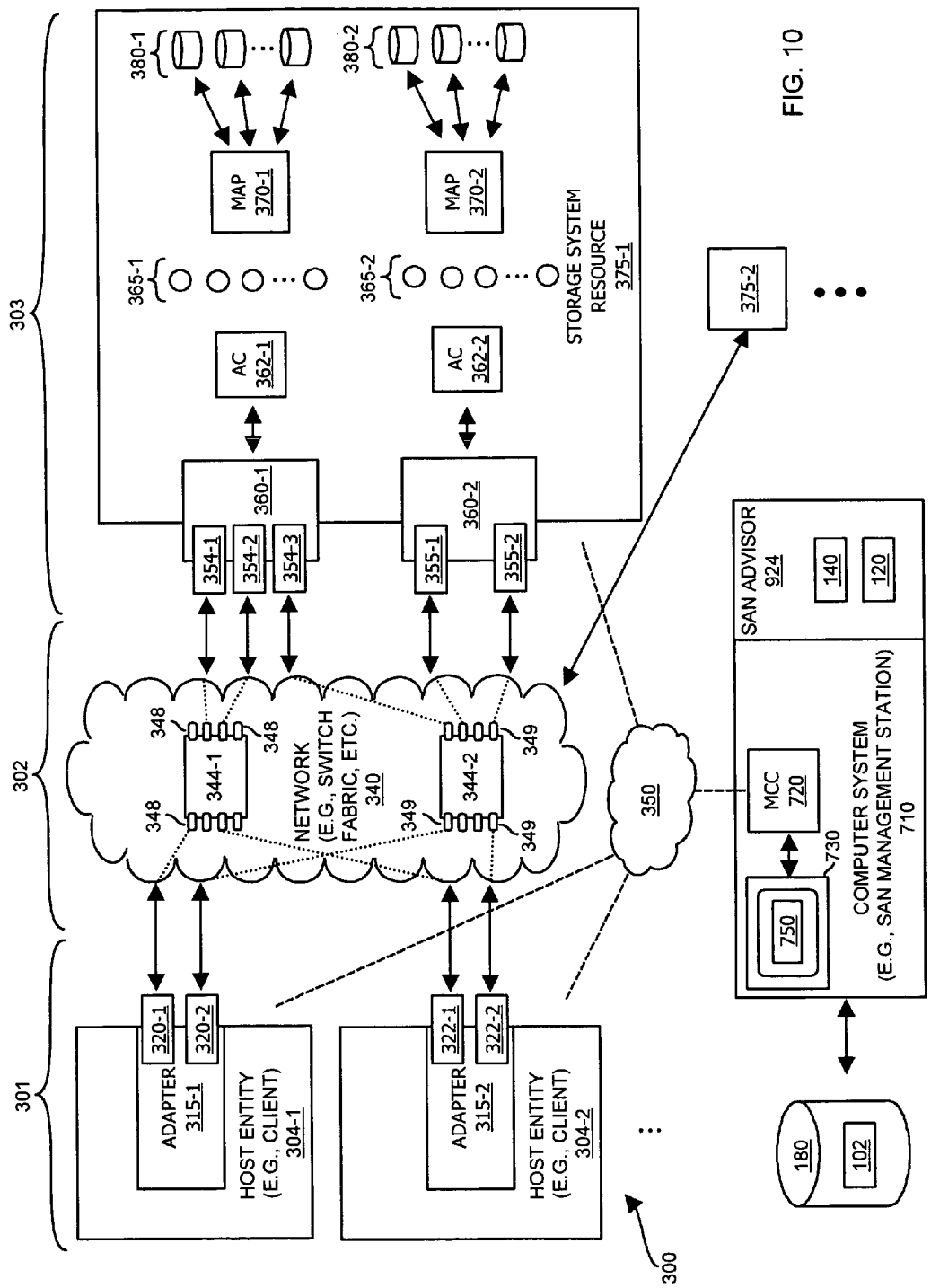
FIG. 10 is a diagram of a sample storage area network environment illustrating different types of resources for use in a storage area network according to an embodiment herein.

FIG. 10 is a block diagram more particularly illustrating connectivity of example network resources (e.g., host resources 301, switch resources 302, and storage resources 303) in a storage area network environment 300. As discussed above, the interoperability rules 102 are stored in repository 180. Records 120 utilized by the information manager 140 of storage area network advisor 924 indicate different combinations of compatible resources that can be used in the storage area network environment 300. Management control center 720 enables a respective user to view and manage network configurations associated with storage area network environment 300 as well as utilize the storage area network advisor 924 to identify one or more combinations of compatible storage area network configurations. For example, a network administrator can query the storage area network advisor 924 (and records 120) to quickly identify whether a current network configuration implemented in storage area network environment 300 or whether a theoretical model of resources is acceptable for use in the storage area network environment 300. Techniques regarding use of storage area network advisor 924 are more particularly discussed in related United States Patent Application entitled "METHODS AND SYSTEMS FOR UTILIZING CONFIGURATION INFORMATION," Ser. No. 11/325,144, the entire teachings of which are incorporated herein by reference as indicated above.

In one embodiment, the storage area network advisor 924 is a "bolt-on" with respect to the management control center 720. In such an instance, the management control center 720 interacts with the storage area network environment to collect data. However, in other embodiments, note that the storage area network advisor 924 can be configured to collect data directly from the storage area network environment as well.

As shown, storage area network environment 300 can include different types of resources. For example, storage area network environment 300 includes host entity 304-1, host entity 304-2, . . . (collectively, host entities 304), network 340 (e.g., a high speed fiber-based switch fabric), network 350 (e.g., LAN, WAN, Internet, intranet, etc.), storage system resource 375-1, storage system resource 375-2, computer system 710, and repository 180. Network 340 includes switch device 344-1, switch device 344-2, and corresponding switch ports 348 and 349. Host entity 304-1 includes adapter 315-1. Adapter 315-1 has a corresponding port 320-1 and port 320-2 to communicate (e.g., via a fiber link) over network 340. Host entity 304-2 includes adapter 315-2. Adapter 315-2 has corresponding port 322-1 and port 322-2 to communicate over network 340. Storage system resource 375-1 includes respective adapters 360-1 and 360-2, corresponding ports 354-1, 354-2, 354-3, 355-1 and 355-2, access controllers 362-1 and 362-2, storage devices 365-1 and 365-2, maps 370-1 and 370-2, as well as physical storage devices 380-1 and 380-2.

At a high level, FIG. 10 illustrates resources of a storage area network that potentially can be viewed and configured by a respective user via graphical user interface 750 supported by management control center 720. Graphical user interface 750 (whether local or remote with respect to computer system 710) facilitates viewing of resources (e.g., an inter-relationship of resources, connectivity of resources, topology of resources, details of resources, etc.) associated with storage area network environment 300 based on different viewing modes.

In terms of the resources as shown in FIG. 10, when properly configured, network 340 and related resources enable host entities 304 (e.g., servers, host computers, etc.) to access data in storage system resources 375 on behalf of respective clients that communicate through host entities 304. As an example, host entity 304-1 (e.g., a server) couples to network 340 via adapter 315-1 and corresponding ports 320. Ports 320 couple to respective ports 348 and 349 on switch devices 344 via a link such as a fiber cable. In turn, ports 348 and 349 of switch devices 344 couple to ports 354 and 355 (e.g., via a fiber cable) of corresponding storage system resources 375.

Based on paths through these resources, host entities 304 access data from physical storage devices 380. For example, host entity 304-1 accesses data from physical storage devices 380 based on a connection path through adapter 315-1, port 320-1, switch 344-1, port 354-1, adapter 360-1 to storage system resource 375-1. Thus, switch devices 344 and corresponding ports 348 and 349 form at least part of a connection path between host entities 304 and corresponding storage system resources 375.

Storage system resource 375-1 includes access controllers 362 to facilitate access to corresponding storage devices 365 (e.g., logical storage space). Storage devices 365 are configured as logical portions of one or more physical storage devices 380 (e.g., arrays of storage disks). Maps 370 provide a mapping of storage devices 365 (e.g., logical volumes) to corresponding physical storage devices 380 (e.g., storage disks).

Each host entity 304 may be limited to accessing certain storage devices 365 in storage system resource 375-1 based at least in part on configuration settings of switch devices 344 of network 340. For example, in one embodiment, switch ports 348 and 349 of switches 344 are assigned to create a particular zone. In general, a zone set defines a group of resources in the network providing a logical path between a host resource and a storage array resource.

As discussed, techniques herein are well suited for use in applications such as management of configuration information or compatibility information associated with storage area networks. However, it should be noted that configurations herein are not limited to use in such applications and thus configurations herein and deviations thereof are well suited for other applications as well.

While this invention has been particularly shown and described with references to preferred embodiments thereof, it will be understood by those skilled in the art that various changes in form and details may be made therein without departing from the spirit and scope of the invention as defined by the appended claims. Such variations are intended to be covered by the scope of this invention. As such, the foregoing description of embodiments of the invention is not intended to be limiting. Rather, any limitations to embodiments of the invention are presented in the following claims.

What is claimed is:

1. A method for managing configuration information associated with a storage area network, the method comprising:
   via at least one processor in a computer system, retrieving configuration information indicating configurations of different types of resources in a storage area network;
   based on the configuration information, generating a set of records, each record in the set including corresponding identifiers indicating the different types of resources associated with a respective storage area network configuration; and
   maintaining the set of records in an order depending on respective values of at least a portion of the corresponding identifiers in the set of records;
   wherein generating the set of records includes:
      generating a first record to include:
         i) a first numerical value that indicates a first type of storage area network resource associated with a first storage area network configuration, and
         ii) a second numerical value that indicated a second type of storage area network resource associated with the first storage area network configuration; and
      generating a second record to include:
         i) the first numerical value indicating the first type of storage area network resource associated with a second storage area network configuration, and
         ii) a third numerical value that indicates a third type of storage area network resource associated with the second storage area network configuration.

2. The method as in claim 1, wherein maintaining the records includes sorting the records such that a contiguous set of records includes at least one same identifier value, the at least one same identifier value indicating a corresponding at least one type of resource for use in the storage area network.

3. The method as in claim 1, wherein generating the set of records includes:
   generating each record in a subset of the records to include corresponding numerical identifiers that identify at least one of a specific host, operating system, switch, and storage array associated with the storage area network.

4. The method as in claim 1, wherein generating the records includes:
   utilizing numerical values to be the corresponding identifiers mapping to the different types of resources associated with the respective storage area network configuration.

5. The method as in claim 1 further comprising:
   after retrieving the configuration information, processing corresponding interoperability statements in the configuration information to identify valid combinations of the different types of resources that can be used in the storage area network.

6. The method as in claim 5 further comprising:
   for each of at least two of the valid combinations:
      i) based on the configuration information, identifying a respective set of interoperable resources that can be validly used together in the storage area network;
      ii) mapping each resource in the respective set of interoperable resources to a corresponding numerical value; and
      iii) creating a respective record to include a set of corresponding numerical values identifying the respective set of interoperable resources that can be validly used together in the storage area network.

7. The method as in claim 6, wherein maintaining the records further includes:
   maintaining the set of records as an array of records, each record including a first respective numerical value identifying a corresponding type of storage area network resource associated with a corresponding valid combination of resources identified by the respective record; and
   sorting the set of records in a sequential order such that the array of records ranges from a first record having a lowest first respective numerical value to a last record having a highest first respective numerical value.

8. The method as in claim 1, wherein maintaining the records further includes:
   sorting the set of records in a sequential order such that the array of records ranges from the first record, which has a lowest first respective numerical value, to a last record having a highest first respective numerical value.

9. The method as in claim 1, wherein generating the set of records includes:

generating a single particular record in the set to indicate multiple different combinations of resources that can be used together in the storage area network, the single particular record including a first identifier of a respective first type of resource and a second identifier of a respective grouping of a second type of multiple different resources, a first combination of interoperable resources defined by the single particular record including the first type of resource and one resource selected from the respective grouping of the second type of multiple different resources, a second combination of interoperable resources defined by the single particular record including the first type of resource and another resource selected from the respective grouping of the second type of multiple different resources.

10. A method for managing configuration information associated with a storage area network, the method comprising:

via at least one processor in a computer system, retrieving configuration information indicating configurations of different types of resources in a storage area network;

based on the configuration information, generating a set of records, each record in the set including corresponding identifiers indicating the different types of resources associated with a respective storage area network configuration; and maintaining the set of records in an order depending on respective values of at least a portion of the corresponding identifiers in the set of records;

wherein retrieving the configuration information includes receiving an interoperability statement indicating configurations of different types of resources that can be validly used in the storage area network, the method further comprising:

processing the received interoperability statement to: i) identify a first type of resource, ii) identify a second type of resource, iii) for the first type of resource, identify a corresponding first resource, and iv) for the second type of resource, identify a group of multiple different resources, each of which can be used in combination with the corresponding first resource as a valid configuration combination in the storage area network; and generating a respective record for each valid configuration combination.

11. The method as in claim 10, wherein generating the respective record for each valid configuration combination includes:

mapping the corresponding first resource to a respective first integer value;

mapping one resource in the group of multiple different resources to a respective second integer value; and mapping another resource in the group of multiple different resources to a respective third integer value.

12. The method as in claim 11, wherein generating the respective record for each valid configuration combination further includes:

generating a first record including the respective first integer value and the respective second integer value to represent a first valid combination of resources for use in the storage area network; and generating a second record including the respective first integer value and the respective third integer value to represent a second valid combination of resources for use in the storage area network.

13. A method for managing configuration information associated with a storage area network, the method comprising:

via at least one processor in a computer system, retrieving configuration information indicating configurations of different types of resources in a storage area network;

based on the configuration information, generating a set of records, each record in the set including corresponding identifiers indicating the different types or resources associated with a respective storage area network configuration;

maintaining the set of records in an order depending on respective values of at least a portion of the corresponding identifiers in the set of records;

sorting the records according to a respective value of a first type of identifier stored in each record of the set of records such that a contiguous subset of records in the set includes a same first identifier value; and sorting the contiguous subset of records based on a second type of identifier value in each record of the contiguous set of records.

14. A computer system for managing configuration information associated with a storage area network, the computer system comprising:

a processor;

a memory unit that stores instructions associated with an application executed by the processor; and an interconnect coupling the processor and the memory unit, enabling the computer system to execute the application and perform operations of:

retrieving configuration information indicating configurations of different types of resources in a storage area network;

based on the configuration information, generating a set of records, each record in the set including corresponding identifiers indicating the different types of resources associated with a respective storage area network configuration; and maintaining the set of records in an order depending on respective values of at least a portion of the corresponding identifiers in the set of records;

wherein generating the set of records includes:

generating a single particular record in the set to indicate multiple different combinations of resources that can be used together in the storage area network, the single particular record including a first identifier of a respective first type of resource and a second identifier of a respective grouping of a second type of multiple different resources, a first combination of interoperable resources defined by the single particular record including the first type of resource and one resource selected from the respective grouping of the second type of multiple different resources, a second combination of interoperable resources defined by the single particular record including the first type of resource and another resource selected from the respective grouping of the second type of multiple different resources.

15. The computer system as in claim 14, wherein generating the records includes:

utilizing numerical values to be the corresponding identifiers mapping to the different types of resources associated with the respective storage area network configuration.

16. The computer system as in claim 14, wherein retrieving the configuration information includes receiving an interoperability statement indicating configurations of different types of resources that can be validly used in the storage area network, the computer system further supporting operations of:

processing the received interoperability statement to: i) identify a first type of resource, ii) identify a second type of resource, iii) for the first type of resource, identify a corresponding first resource, and iv) for the second type of resource, identify a group of multiple different resources, each of which can be used in combination with the corresponding first resource as a valid configuration combination in the storage area network; and generating a respective record for each valid configuration combination.

17. The computer system as in claim 16, wherein generating the respective record for each valid configuration combination includes:

mapping the corresponding first resource to a respective first integer value;

mapping one resource in the group of multiple different resources to a respective second integer value;

mapping another resource in the group of multiple different resources to a respective third integer value;

generating a first record including the respective first integer value and the respective second integer value to represent a first valid combination of resources for use in the storage area network; and generating a second record including the respective first integer value and the respective third integer value to represent a second valid combination of resources for use in the storage area network.

18. A computer system for managing configuration information associated with a storage area network, the computer system comprising:

a processor;

a memory unit that stores instructions associated with an application executed by the processor; and an interconnect coupling the processor and the memory unit, enabling the computer system to execute the application and perform operations of:

retrieving configuration information indicating configurations of different types of resources in a storage area network;

based on the configuration information, generating a set of records, each record in the set including corresponding identifiers indicating the different types of resources associated with a respective storage area network configuration;

maintaining the set of records in an order depending on respective values of at least a portion of the corresponding identifiers in the set of records;

after retrieving the configuration information, processing corresponding interoperability statements in the configuration information to identify valid combinations of the different types of resources that can be used in the storage area network; and for each of at least two of the valid combinations:

i) based on the configuration information, identifying a respective set of interoperable resources that can be validly used together in the storage area network;

ii) mapping each resource in the respective set of interoperable resources to a corresponding numerical value; and iii) creating a respective record to include a set of corresponding numerical values identifying the respective set of interoperable resources that can be validly used together in the storage area network.

19. The computer system as in claim 18, wherein maintaining the records further includes:

maintaining the set of records as an array of records, each record including a first respective numerical value identifying a corresponding type of storage area network resource associated with a corresponding valid combination of resources identified by the respective record; and sorting the set of records in a sequential order such that the array of records ranges from a first record having a lowest first respective numerical value to a last record having a highest first respective numerical value.

20. The computer system as in claim 19, wherein maintaining the records further includes:

maintaining the set of records as an array of records, each record in the array further including a second respective numerical value identifying a corresponding type of storage area network resource associated with a corresponding valid configuration of resources identified by the respective record; and sorting a contiguous group of records in the array, each record in the group having a same respective first numerical value, based on a sequential ordering such that the contiguous group of records in the array ranges from a first record having a lowest second respective numerical value to a last record having a highest second respective numerical value.

* * * * *